(12) United States Patent
Esper et al.

(10) Patent No.: US 9,302,375 B2
(45) Date of Patent: Apr. 5, 2016

(54) DRIVING FEATURE

(75) Inventors: Stephan Esper, Neuwied (DE); Robert Bongartz, Neuss (DE)

(73) Assignee: Ruia Global Fasteners AG, Neuss (DE)

( * ) Notice: Subject to any disclaimer, the term of this patent is extended or adjusted under 35 U.S.C. 154(b) by 269 days.

(21) Appl. No.: 13/979,600

(22) PCT Filed: Jan. 10, 2012

(86) PCT No.: PCT/DE2012/200000
§ 371 (c)(1),
(2), (4) Date: Jul. 23, 2013

(87) PCT Pub. No.: WO2012/097810
PCT Pub. Date: Jul. 26, 2012

(65) Prior Publication Data
US 2014/0007746 A1    Jan. 9, 2014

(30) Foreign Application Priority Data

Jan. 13, 2011   (DE) .................... 20 2011 001 423 U (51) Int. Cl.
*B25B 15/00*   (2006.01)
*F16B 23/00*   (2006.01)

(52) U.S. Cl.
CPC ............. *B25B 15/005* (2013.01); *F16B 23/003* (2013.01)

(58) Field of Classification Search
CPC .. B25B 15/005; B25B 13/005; B25B 13/065; F16B 23/003
USPC ................... 81/121.1, 436, 460, 461
See application file for complete search history.

(56) References Cited

U.S. PATENT DOCUMENTS

| | | | | |
|---|---|---|---|---|
| 3,908,488 | A * | 9/1975 | Andersen ................ | 81/121.1 |
| 5,279,190 | A * | 1/1994 | Goss et al. ................ | 81/460 |
| 5,435,680 | A * | 7/1995 | Schuster ................ | 81/460 |
| 8,182,187 | B2 * | 5/2012 | Siong .................... | 81/460 |
| 8,616,097 | B2 * | 12/2013 | Hughes et al. .......... | 81/460 |

FOREIGN PATENT DOCUMENTS

EP      0087721    2/1983

* cited by examiner

*Primary Examiner* — Hadi Shakeri
(74) *Attorney, Agent, or Firm* — Head, Johnson & Kachigian, P.C.

(57) ABSTRACT

Rotationally symmetrical force-application means with, as viewed axially, a star-shaped outer contour or inner contour, for connecting elements, wherein the individual arms of the star are designed as pointed arcs, of which the outer points lie on a common outer circle, wherein an associated counterpart, in particular a bit, insert or screw head, has a mating contour which is adapted to the contour of the force-application means such that the radii of the flanks of the force-application means and the counterpart end up butting against one another in such a manner as to achieve a planar pressing surface.

10 Claims, 3 Drawing Sheets

DRIVING FEATURE

CROSS-REFERENCE TO RELATED APPLICATIONS

The present application is a national phase application of International PCT Patent Application No. PCT/DE2012/200000 filed Jan. 10, 2012.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable.

BACKGROUND OF THE INVENTION

1. Field of the Invention

This invention relates to a rotationally symmetrical star-shaped driving feature, preferably for rotatable fasteners, such as, e.g. screws, and the associated drive tools.

2. Description of the Related

Driving features of this kind, also referred to as drive systems, are known in the prior art.

These are designed either as external driving features or as internal driving features and for the purposes of this application the terms "external driving feature" or "external drive" and "internal driving feature" or "internal drive" always refer to the type of driving feature on the fastener, i.e. on the screw. An external driving feature can therefore be driven by a tool having a corresponding internal driving feature and vice versa.

The oldest driving feature of this kind is the common hexagon drive, already known for centuries as an external driving feature and marketed by the Applicant as an internal driving feature, e.g. under the trade mark "INBUS®".

The Applicant has also provided corresponding developments in this area, namely the hexalobular driving features available on the market under the trade mark "Torx®", as well as the further improved flattened hexalobular driving features sold under the trade mark "Torx Plus®".

These hexalobular driving features offer many advantages over conventional drives such as the hexagon drive, such as high force transmission, long tool life and the option of a low-profile design, i.e. a particularly flat design for the driving features in order to save weight.

However, problems are frequently encountered with these modern driving features during maintenance and repair work, as the corresponding special tools suitable for the respective driving features are not available in every required size in every workshop.

When a fastener such as a modern hexalobular driving feature has to be removed during repair work, there has hitherto been no alternative other than to use the drive provided especially therefor.

Some sections of the German automotive industry have already recognised this problem and have therefore been quite restrained in their use of modern hexalobular driving features, particularly the "Torx Plus®" drive, as corresponding tools for this drive system are not available in Europe or can only be obtained with extreme difficulty. The situation would appear to be similar in the burgeoning Asian market.

Furthermore, in the known driving features, forces are transmitted between the tool and the fastener via very small, sometimes only linear pressing surfaces, resulting in high surface loading.

In addition, the normal force produced at the contact point, i.e. the force acting perpendicularly to the contact surface, passes through the outwardly projecting corner, e.g. of a hexagon screw and therefore acts upon this corner as an undesirable shear force, which may lead to premature failure of this drive.

BRIEF SUMMARY OF THE INVENTION

The aim of this invention is therefore to provide a driving feature, particularly on a fastener such as a screw, which can be driven by all of these tools, i.e. (of course) by the tool matching the driving feature according to the invention, particularly a tool having an analogous design, but also by a hexagon tool matching only in terms of size, as well as by a "Torx®" tool or a "Torx Plus®" tool matching only in terms of size, and in which, in particular, shear forces at the areas of the application of force are minimised.

A tool by means of which corresponding driving features of any kind, i.e. both hexagon and also Torx® and Torx Plus® driving features, can be driven without the tool having to be changed each time or without having to look for or purchase another tool may also be provided according to the invention, although this is not the most important feature.

It should thus be possible to use the drive system according to the invention both as an internal and as an external driving feature and it should be compatible in both cases with hexagonal, hexalobular and flattened hexalobular driving features as described hereinabove.

The driving feature according to the invention should moreover at least meet, if not exceed, the previous requirements with respect to tool life, force transmission and weight reduction to which users have become accustomed in the case of hexalobular and flattened hexalobular drives and should simultaneously offer the option of being driven by means of common tools available on the market during maintenance or repair work with no loss of durability.

This problem is solved according to the invention by a rotationally symmetrical star-shaped driving feature in which the individual arms of the star are designed as pointed arcs and, in particular, the radii of the pointed arcs are designed so as to minimise shear forces at the areas of the application of force.

This problem according to the invention can also be solved by a rotationally symmetrical driving feature in which the contour of the driving feature is formed of individual radii merging into one another, the centre points of which are arranged with uniform spacing on an inner circle around the axis of rotation of the driving feature.

Optimum adaptation to the various driving features of the prior art is achieved in that the pointed arcs are delimited by radii, the centre points of which lie on an inner circle around the axis of rotation of the driving feature.

The production of the driving feature according to the invention is simplified if the individual flanks in the form of radii each merge into one another at their points of intersection by means of a very small tangentially adjacent transition radius.

As six-point geometric designs are normally used for driving features of this kind, it is preferred from the point of view of compatibility for the driving feature according to the invention to have six arms each delimited by two radii departing from six centre points on an inner circle around the axis of rotation of the driving feature and each arranged with a spacing of 60° in such a manner that the left-hand boundary of one arm is formed by the same radius as the right-hand boundary of a right-hand adjacent, particularly the immediately right-hand adjacent, arm and the right-hand boundary of one arm is formed by the same radius as the left-hand boundary of a left-hand adjacent arm.

This invention may of course also be applied to any desired number of driving feature flanks, e.g. four, eight, ten or twelve driving features, or to other rotationally symmetrical driving features. However, these are not as commonly found on the market.

In order to ensure the optimum transmission of forces between the internal and external contours according to the invention, it is particularly preferable for a counterpart associated with the contour according to the invention to have a mating contour according to the invention adapted in such a manner that the radii of the flanks of the contour and the mating contour come to bear against one another so as to produce a flat bearing surface. By contrast, the common drive forms available on the market offer only a linear contact surface, leading to increased wear and therefore to a shorter tool life.

Flat bearing contact can only be achieved by specially adapting all of the radii and circle diameters to one another.

The diameter of the inner circle on which the centre points of the radii lie around the axis of rotation is approximately 4% to 6%, particularly 5%, larger in the case of the external contour than the inner circle of the corresponding internal contour.

All of the other radii, particularly the radii of the flanks of the external contour are 4% to 12%, preferably 6% to 10%, preferably 8% to 10%, smaller than in the case of the associated internal contour.

Exclusively this geometric design ensures ideal surface bearing con tact between the tool and the screw. Simple scaling by a constant factor X would lead only to linear bearing contact, as the inner circle diameter would then also be increased and not reduced.

Selecting the radii of the pointed arcs and the inner circle in such a manner that a normal force acting on the pointed arc extends from each point of the pointed arc in the case of an external driving feature into the solid core of the contour radially within the inner transition radii prevents shear forces from being applied to the arms of the star-shaped contour and increases tool life.

The driving feature can additionally be improved by further measures:

The external driving feature on the fastener, particularly a screw head, will first be considered. In this case, care should be taken to ensure that:

in the case of the fastener, a. the inner transition radius ($r_i$) is between 9.0% and 12.5%, preferably between 10.0% and 11.5%, of the flank radius (16)

and/or the outer transition radius ($r_a$) is between 6.6% and 9.5%, preferably between 7.6% and 8.6%, of the flank radius (16)

and/or the diameter of the inner circle (14) is between 40% and 45%, preferably between 42% and 43%, preferably between 42.6% and 42.7%, of the diameter of the outer circle (22), in the case of the tool, particularly the socket, the inner transition radius ($R_i$) is between 5.0% and 7.5%, preferably between 5.6% and 6.8%, of the flank radius (116)

and/or the outer transition radius ($R_a$) is between 3.5% and 6.5%, preferably between 4.35% and 5.6%, of the flank radius (116)

and/or the diameter of the inner circle (114) is between 36% and 41%, preferably between 38% and 39.5%, preferably between 38.7% and 38.8%, of the diameter of the outer circle (122), in the case of the fastener without taking account of the transition radius, i.e. in the case of flanks of the arms (18) merging into one another at an acute angle, the outer tangential angle ($\alpha 1$) is between 70° and 73°, preferably between 70.5° and 72°, preferably between 71.0° and 71.5°, and/or the inner tangential angle ($\alpha 2$) is between 55° and 59°, preferably between 56° and 58°, preferably between 56.5° and 57.5°, and in the case of the tool, particularly the socket, without taking account of the transition radius, i.e. in the case of flanks of the arms (118) merging into one another at an acute angle, the outer tangential angle ($\beta 1$) is between 71° and 76°, preferably between 72.5° and 75.5°, preferably between 73.5° and 74.0°, and/or the inner tangential angle ($\beta 2$) is between 57° and 63°, preferably between 58.5° and 61.5°, preferably between 59.5° and 60.5°.

On the other hand, when considering the internal driving feature on the fastener, particularly a screw head, care should be taken to ensure that:

in the case of the fastener, the inner transition radius ($r_i$) is between 6.0% and 9.5%, preferably between 7.0% and 8.5%, of the flank radius (16)

and/or the outer transition radius ($r_a$) is between 13.5% and 17.5%, preferably between 14.5% and 16.5%, of the flank radius (16)

and/or the diameter of the inner circle (14) is between 36% and 42%, preferably between 37% and 41%, preferably between 37.9% and 40.0%, of the diameter of the outer circle (22), in the case of the tool, particularly the socket, the inner transition radius ($R_i$) is between 9.0% and 12.5%, preferably between 10.0% and 11.5%, of the flank radius (116)

and/or the outer transition radius ($R_a$) is between 6.5% and 10.0%, preferably between 7.5% and 9.0%, of the flank radius (116)

and/or the diameter of the inner circle (114) is between 40% and 45%, preferably between 41% and 44%, preferably between 42% and 43%, of the diameter of the outer circle (122), in the case of the fastener without taking account of the transition radius, i.e. in the case of flanks of the arms (18) merging into one another at an acute angle, the outer tangential angle ($\alpha 1$) is between 72.5° and 75°, preferably between 73° and 74.5°, preferably between 73.5° and 74°, and/or the inner tangential angle ($\alpha 2$) is between 60° and 63°, preferably between 60.5° and 62°, preferably between 60.7° and 61.5°, and in the case of the tool, particularly the socket, without taking account of the transition radius, i.e. in the case of flanks of the arms (118) merging into one another at an acute angle, the outer tangential angle ($\beta 1$) is between 69° and 74°, preferably between 70° and 73°, preferably between 71° and 72°, and/or the inner tangential angle ($\beta 2$) is between 54° and 59°, preferably between 55° and 58°, preferably between 56° and 57°.

The driving feature can additionally be improved by further measures in cooperation with a known internal or external hexagon drive:

The external driving feature on the fastener, particularly a screw head, will first be considered. in this case, care should be taken to ensure that:

in the case of an external driving feature on the fastener according to the invention, particularly a screw head having an external contour, in the case of the fastener according to the invention, particularly a screw head having an external contour, the flank radius 16 has dimensions of 2.55 times to 2.85 times, preferably 2.65 times to 2.75 times, and/or the inner circle 14 has dimensions of 4.1 times to 4.3 times, preferably 4.15 times to 4.25 times, and/or the intermediate circle 21 has dimensions of 2.15 times to 2.45 times, preferably 2.25 times to 2.35 times, and/or the outer circle 22 has dimensions of 1.65 times to 1.95 times preferably 1.75 times to 1.85 times the width of the matching known hexagon key.

On the other hand, when considering the internal driving feature on the fastener, particularly a screw head, care should be taken to ensure that:

in the case of an internal driving feature on the fastener according to the invention, particularly the screw head having an internal contour, in the case of the fastener according to the invention, the flank radius 116 has dimensions of 2.05 times to 2.35 times, preferably 2.15 times to 2.25 times, and/or the inner circle 114 has dimensions of 3.75 times to 4.05 times, preferably 3.85 times to 3.95 times, and/or the intermediate circle 121 has dimensions of 1.75 times to 2.05 times, preferably 1.85 times to 1.95 times, and/or the outer circle 122 has dimensions of 1.35 times to 1.65 times, preferably 1.45 times to 1.55 times the breadth of the known matching external hexagon screw head.

BRIEF DESCRIPTION OF THE SEVERAL VIEWS OF THE DRAWINGS

Several embodiments of this invention will now be described in more detail with reference to the accompanying drawings, in which.

DETAILED DESCRIPTION OF THE INVENTION

Figure 1:
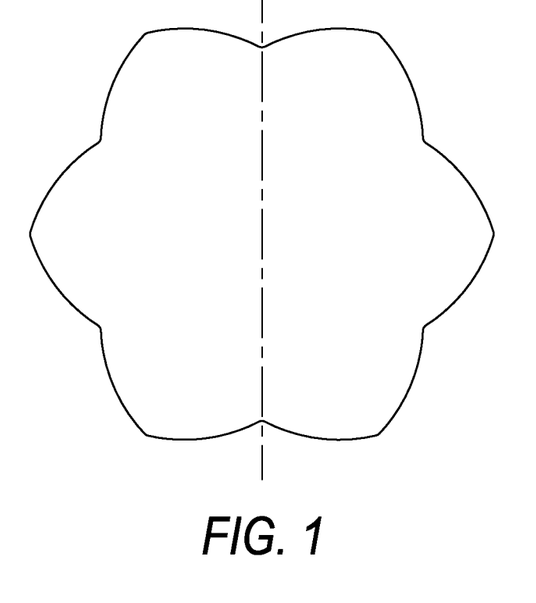
FIG. 1 shows the basic form of a six-point symmetrical driving feature according to the invention suitable both as an external and as an internal driving feature.

FIG. 1 shows the basic principle of the drive according to the invention with reference to a six-point rotationally symmetrical driving feature. It should be taken into consideration in this connection that the contour shown for the driving feature may serve either as an internal driving feature (the areas within the contour are then excluded) or as an external driving feature (the contour then delimits the head of the fastener situated therewithin).

Figure 2:
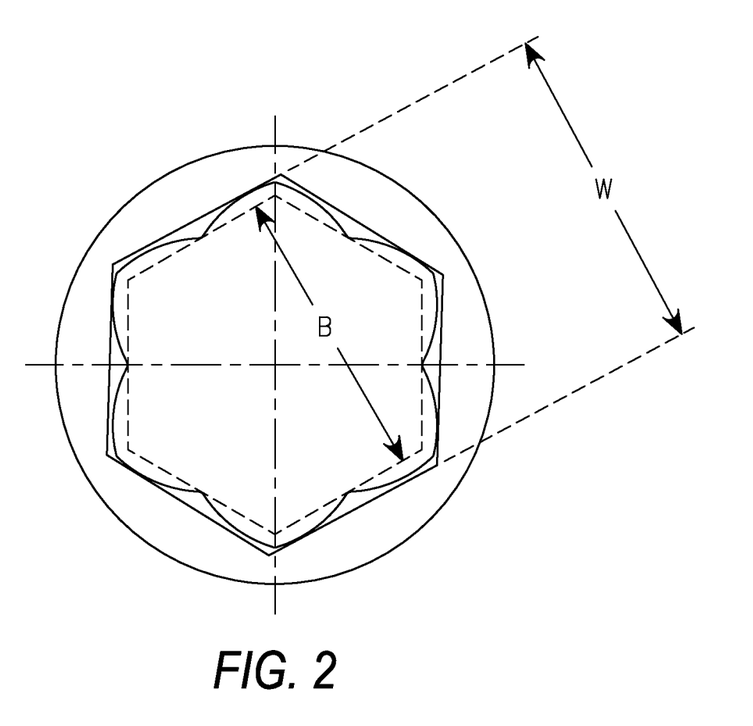
FIG. 2 shows the cooperation of an external contour according to the invention with a hexagonal internal contour.
Figure 3:
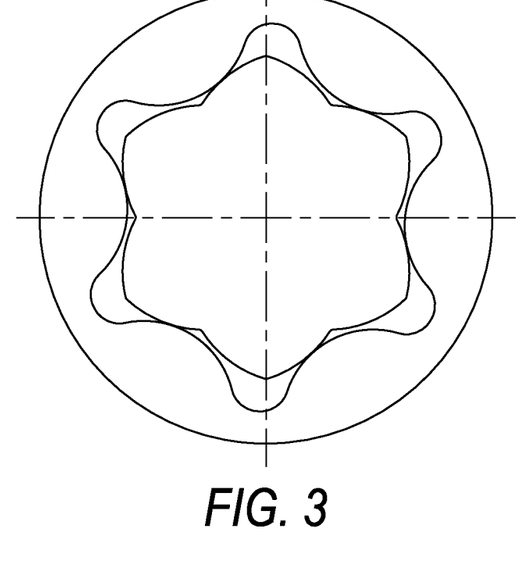
FIG. 3 shows the cooperation of an external contour according to the invention with a hexalobular internal contour.
Figure 4:
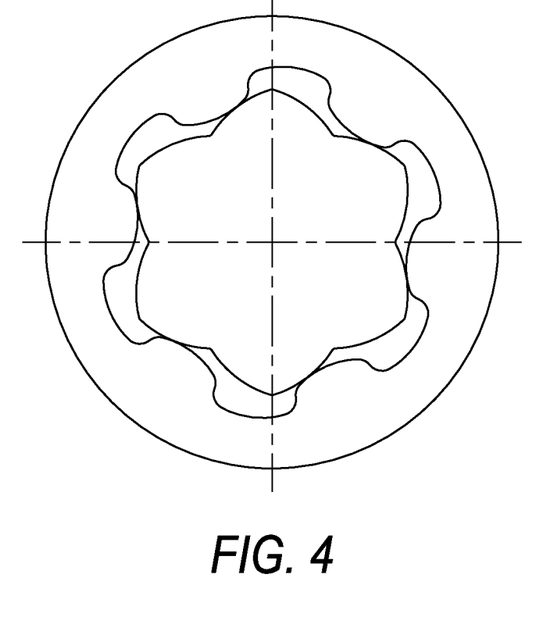
FIG. 4 shows the cooperation of an external contour according to the invention with a hexalobular flattened internal contour.

FIGS. 2 to 4 show the cooperation of an external contour, i.e. a bit or a screw head, according to this invention with the various internal contours common in the prior art, as are commercially available, e.g. as tools or fasteners. The precise geometric design for producing the contour according to FIG. 1 will be described hereinafter with reference to detailed FIGS. 5 and 6.

FIG. 2 shows the cooperation of an external contour according to the invention with a hexagonal internal contour of width W indicated by a solid line, i.e., e.g. a normal internal hexagon socket available in any workshop. As shown, either a screw or a nut provided with an external driving feature according to the invention can be driven as shown here by a normal hexagon tool of width W.

FIG. 2 shows the cooperation of an internal contour according to the invention with a hexagonal external contour of breadth B indicated by a dotted line, i.e., e.g. a normal external hexagon screw head available in any workshop.

It should be noted in this connection that forces are not only transmitted with a linear action at the edge of the external driving feature as in the case of the cooperation of a hexagon external driving feature with a corresponding hexagon tool, but, according to the invention, forces are also transmitted with a tangential action via the radius, resulting in a substantially larger force-application surface and significantly improved distribution of forces, such that damage to the cooperating driving features would not be expected until significantly higher forces than in the case of the cooperation of two hexagonal driving features according to the prior art.

FIG. 3 shows the cooperation of the same external contour according to the invention, i.e., e.g. a corresponding screw head, with a hexalobular socket, as sold, e.g. by the Applicant under the trade name "Torx®".

Here too it will be quite clear that the driving feature according to the invention leads in each case to tangential force transmission via large radii and therefore to planar force transmission.

As shown in FIG. 3, an external contour according to the invention can thus be driven by a commercially available "Torx®" internal contour.

FIG. 4 finally shows the combination of the same external contour according to the invention and a hexalobular flattened internal contour as sold by the Applicant under the name "Torx Plus®". Here too forces are transmitted in a tangentially planar manner between very large radii.

In FIG. 4 too, a "Torx Plus®" internal contour is driven in this manner by the same tool bit according to the invention.

As will be immediately clear from FIGS. 2 to 4, an external contour according to the invention is therefore suitable for driving all three systems available on the market (hexagonal "Inbus®", hexalobular "Torx®" and flattened hexalobular "Torx Plus®") and of course for driving an internal contour according to the invention.

Conversely, it can be shown with reference to FIGS. 2 to 4 how, in principle, an external contour according to the invention can also be driven by means of all of the tools (internal contours) available on the market, namely hexagon, hexalobular and flattened hexalobular drives.

It is not shown that an internal contour according to the invention can also conversely be driven according to the invention by hexagon, hexalobular "Torx®" and hexalobular flattened "Torx Plus®" external contours.

The geometric design leading to the contour according to the invention will now be described in detail in FIGS. 5 and 6 hereinafter.

Figure 5:
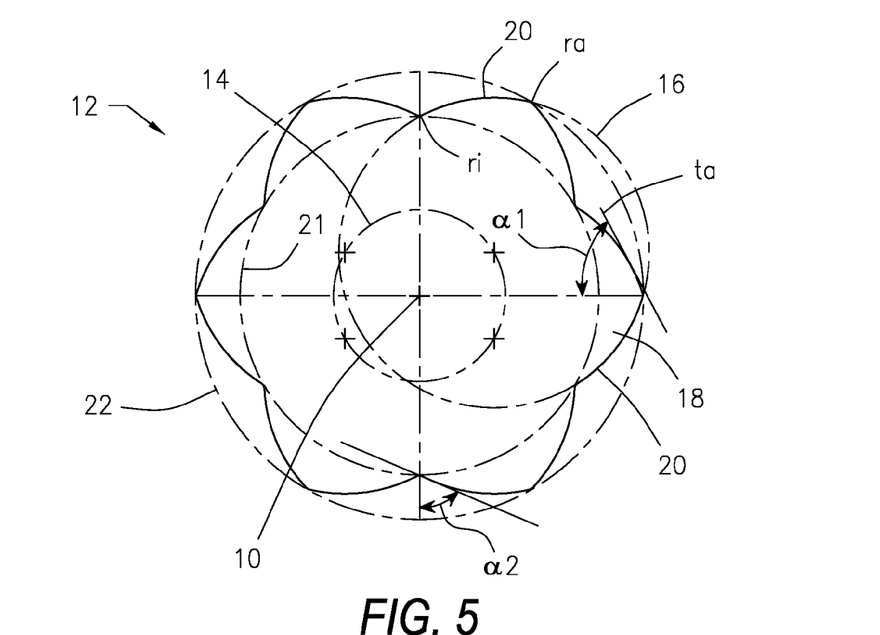
FIG. 5 shows the geometric design, including dimensioning, of an external contour according to the invention (e.g. a bit)

FIG. 5 shows in this connection the geometric design for an external contour 12, i.e., e.g. a bit. For the sake of clarity, dimensioning is also specified here, although this of course relates only to the one example shown. The solution according to the invention may also be smaller or larger as desired.

As shown in FIG. 5, the contour according to the invention for, e.g. an external driving feature 12 is designed by way of an inner circle 14 concentric with the axis of rotation 10 of the driving feature 12. The centre points of the six further circles, the circular arcs of which form the external contour 12 are arranged with uniform spacing, i.e. each with a spacing of 60 degrees, on the inner circle 14. For the sake of clarity of the drawing, only the circle 16 is shown top right. Only the centre points of the other circles are shown on the concentric inner circle 14 by means of crosses.

As a result of this geometric design, the external contour 12 according to the invention shown has a star-shaped design with six arms 18 each arranged with a spacing of 60°. These arms 18 are in the form of a pointed arc formed in that the respective outer radii 20 each having two adjacent arms 18 are each formed by the circular arc portion of the same circle 16, the centre point of which is arranged between the two arms 18.

Figure 6:
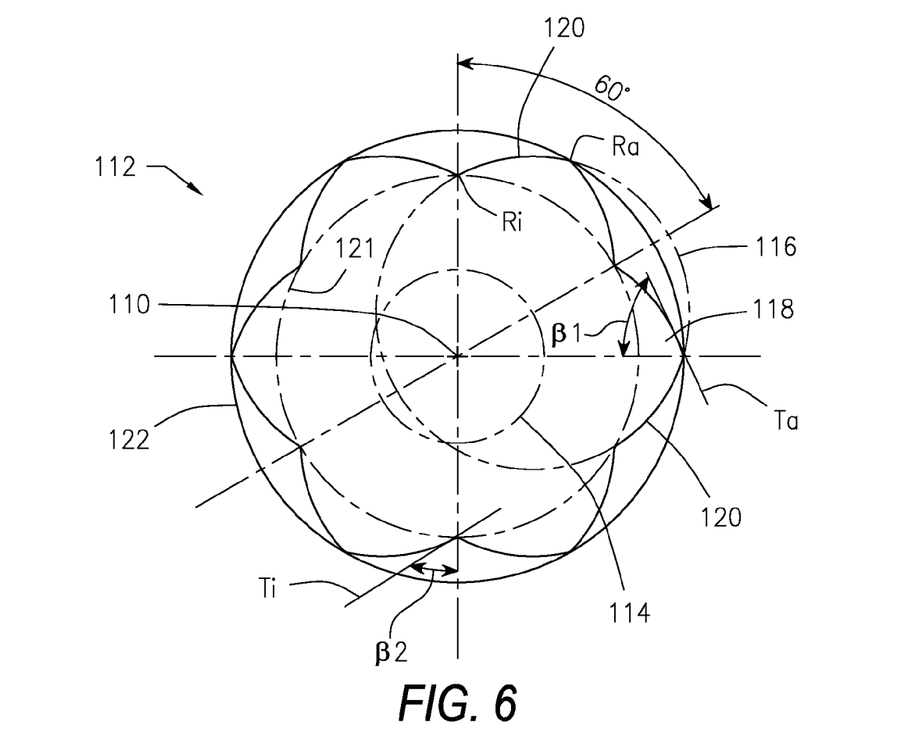
FIG. 6 shows the same design for an optimised internal contour (e.g. a socket) according to this invention.

FIG. 6 shows the counterpart 112 to the external contour 12 of FIG. 5, i.e. an internal contour 112 according to the invention adapted to the external contour 12 of FIG. 5, suitable both for driving by a bit according to FIG. 5 and by corresponding hexagon, hexalobular or flattened hexalobular external contours. Here too the dimensioning produced when the internal contour 112 is adapted in the optimum manner to the external contour 12 of FIG. 5 according to the invention is specified.

Internal contours according to the invention may of course be produced with any desired dimensions.

As shown in FIG. 6, the design of the internal contour 112 according to the invention follows the same rules and structures as the external driving feature 12 of FIG. 5 according to the invention.

Here too an axis of rotation 110 around which a concentric inner circle 114 is drawn is provided for the internal contour 112. The centre points of the six further circles 116, the circular arcs of which form the internal contour 112 are arranged with uniform spacing, i.e. each with a spacing of 60 degrees, on the inner circle 114. Here too for the sake of clarity of the drawing, only one of these circles, namely the circle 116 top right, is shown. The internal contour 112 according to the invention shown in FIG. 6 thus also has a star-shaped design with six arms 118 each arranged with a spacing of 60°. These arms 118 are also in the form of a pointed arc formed in that the respective outer radii 120 each having two adjacent arms 118 are each formed by the circular arc portion of the same circle 116, the centre point of which is arranged between the two arms 118. The left-hand boundary of one arm 118 is thus formed by the same radius 120 as the right-hand boundary of a right-hand adjacent arm 118 and the right-hand boundary of one arm is formed by the same radius as the left-hand boundary of a left-hand adjacent arm.

The difference between the external driving feature 12 according to FIG. 5 and the internal driving feature 112 according to FIG. 6 consists simply in that the diameter of the circular arcs 120 delimiting the arms 118 is just under 10% larger in the case of the internal driving feature 112 than in the case of the external driving feature 12.

The inner circles 14; 114 on which the centre points of the circles 20, 120 are arranged are consequently almost identical in size.

Another difference consists in that, in the case of the external contour of FIG. 5, the respective circular arcs 20 merge into one another by means of slightly larger tangentially adjacent transition radii ri, ra at the outer and inner contact points of the flanks of the arms than the transition radii Ri, Ra in the case of the internal contour 112. These small transition radii are preferably only just under half as large in the case of the internal contour 112 of FIG. 6 as in the case of the external contour 12 of FIG. 5.

A universal drive the contour of which consists of individual radii merging into one another, rotating about the axis of rotation of the drive in an offset circle with a spacing of 60° is therefore provided according to the invention. The points of intersection of the radii are thus preferably rounded relative to one another by means of a tangentially adjacent radius. The associated counterpart 112 has a mating contour of matching shape so that the radii of the flanks come to bear against one another so as always to produce a flat working surface.

The geometric form of the radii of the drive according to the invention is designed in such a manner that all of the drives provided therefor (hexagonal, Inbus®, Torx®, Torx Plus®) are always offered the optimum working surface. This prevents increased wear and ensures optimum force transmission. This ideal force transmission is provided both during removal and during retightening.

As already stated hereinabove, this invention is suitable both for external and for internal drives. The flanks are symmetrical to one another in the tightening direction and in the removal direction.

The drive according to the invention therefore has six specially designed flanks, allowing it to be driven not only by the tool provided therefor, but, if necessary, additionally removed and also screwed back on again by all of the common drives available on the market (Torx®, Torx Plus® and hexagon).

The flank design according to the invention additionally allows for optimum force transmission and a long bit life, as the geometric form of the radii according to the invention ensures low contact pressure.

The drive and the bit are adapted to one another geometrically in such a manner that the transmission of forces by the bit leads to a flat bearing surface (e.g. the conventional hexagon drive offers only a linear bearing surface as a result of its geometric form). The contact pressure per flank for a given force transmission is therefore reduced in this invention compared to conventional hexagon drives.

In addition, the flanks have a geometric design according to the invention such that they also always offer an optimum working surface for equivalent drives (hexagon, hexalobular and flattened hexalobular). In all of these drive systems, the force-application surfaces lie flat on the radius contour. The geometric design of the invention is therefore adapted in an optimum manner for all of the systems. Forces are not transmitted by means of tilting of the bit on the drive, as this would lead to increased wear.

Tangents ti, ta, Ti, Ta are moreover shown by way of example in FIGS. 5 and 6 at the innermost end and at the outermost end of the circular segmental flanks of some of the arms. The inner tangential angle $\alpha 2$ or $\beta 2$ is the angle included by the tangent ti, Ti to the innermost end of a flank and a radially extending line extending through the inner meeting point of two adjacent flanks lying on the intermediate circle 21 or 121. These are of course the angles that would be produced if the circular segmental flanks of the arms were to merge into one another without a transition radius, i.e. at an acute angle.

In an analogous manner, the outer tangential angle $\alpha 1$ or $\beta 1$ is the same angle in the case of a tangent ta, Ta to the outermost end of a flank.

The respective angles are different for an external contour and an internal contour and they additionally differ depending on whether the fastener is an external driving feature or an internal driving feature.

Thus, by way of a concrete numerical example, on the one hand, a screw head according to the invention shown in FIG. 2 having an external contour with six arms can be removed very effectively by a known internal hexagon contour of dimensions M10 (width W=approx. 10 mm) if the flank radius 16 has dimensions of 7.432 mm
and/or
the inner circle 14 has dimensions of 4.741 mm
and/or
the intermediate circle 21 has dimensions of 8.706 mm
and/or
the outer circle 22 has dimensions of 11.114 mm
and, on the other hand, a screw head according to the invention having an internal contour with six arms can be removed very effectively by a known external hexagon contour (hexagon key) of dimensions M10 (breadth B=approx. 7 mm) if
the flank radius 116 has dimensions of 8.405 mm
and/or
the inner circle 114 has dimensions of 3.578 mm
and/or
the intermediate circle 121 has dimensions of 7.460 mm
and/or
the outer circle 122 has dimensions of 9.199 mm.
Legend
10, 110 axis of rotation
12 external driving feature, external contour
14, 114 concentric inner circle
16, 116 circle, flank radius
18, 118 spaced arms
20, 120 radius
21, 121 intermediate circle
22, 122 outer circle
112 internal driving feature, internal contour
ri, Ri inner transition radius
ra, Ra outer transition radius
$\alpha 1$, $\beta 1$ outer tangential angle
$\alpha 2$, $\beta 2$ inner tangential angle
ti, Ti inner tangent
ta, Ta outer tangent
W width of hexagon key
B breadth of hexagon screw

SEQUENCE LISTING

Not Applicable

What is claimed is:

1. A combination of a bit having a star-shaped external contour as viewed axially and a mating socket having a star-shaped internal contour as viewed axially, which comprises:
individual arms of the star are pointed arcs, the outer points of which lie on a common outer circle, the pointed arcs being delimited by two radii, the centre points of which lie on an inner circle around the axis of rotation of the driving feature and the contour of the bit having a mating contour on the socket adapted in such a manner that the radii of the flanks of the bit and the socket come to bear against one another so as to produce a flat pressing surface, wherein, the bit and the socket are adapted to one another in that the radii of the bit are 4% to 12% smaller than the associated socket, while the inner circle of the bit and inner circle of the socket on which the centre points of the radii are arranged around the axis of rotation of the bit and the socket have diameter, wherein the diameter of the inner circle of the bit is up to 6% larger than the diameter of the inner circle of the socket, characterised in that, for a driven bit screw head of a fastener an inner transition radius ($r_i$) is between 9.0% and 12.5% of the flank radius and an outer transition radius ($r_a$) is between 6.6% and 9.5% of the flank radius and the diameter of the inner circle is between 40% and 45% of the diameter of an outer circle.

2. A combination of a bit having a star-shaped external contour as viewed axially and a mating socket having a star-shaped internal contour as viewed axially, which comprises:
individual arms of the star are pointed arcs, the outer points of which lie on a common outer circle, the pointed arcs being delimited by two radii, the centre points of which lie on an inner circle around the axis of rotation of the driving feature and the contour of the bit having a mating contour on the socket adapted in such a manner that the radii of the flanks of the bit and the socket come to bear against one another so as to produce a flat pressing surface, wherein, the bit and the socket are adapted to one another in that the radii of the flanks of the bit are 4% to 12% smaller than the associated socket, while the inner circle of the bit and the inner circle of the socket on which the centre points of the radii are arranged around the axis of rotation of the bit and the socket diameter, wherein the diameter of the inner circle of the bit is up to 6% larger than the diameter of the inner circle of the socket,
characterised in that, for a driving socket tool, an inner transition radius ($R_i$) is between 5.0% and 7.5% of the flank radius and an outer transition radius (R) is between 3.5% and 6.5% of the flank radius and the diameter of an inner circle is between 36% and 41% of the diameter of the outer circle.

3. A combination of a bit having a star-shaped external contour as viewed axially and a mating socket having a star-shaped internal contour as viewed axially, which comprises:
individual arms of the star are pointed arcs, the outer points of which lie on a common outer circle, the pointed arcs being delimited by two radii, the centre points of which lie on an inner circle around the axis of rotation of the driving feature and the contour of the bit having a mating contour on the socket adapted in such a manner that the radii of the flanks of the bit and the socket come to bear against one another so as to produce a flat pressing surface, wherein, the bit and the socket are adapted to one another in that the radii of the flanks of the bit are 4% to 12% smaller than the associated socket, while the inner circle of the bit and inner circle of the socket on which the centre points of the radii are arranged around the axis of rotation of the bit and the socket have diameter, wherein the diameter of the inner circle of the bit is up to 6% larger than the diameter of the inner circle of the socket,
characterised in that, for a driven bit on a fastener, for example on a screw head, an outer tangential angle ($\alpha 1$) is between 70° and 73° and an inner tangential angle ($\alpha 2$) is between 55° and 59°.

4. A combination of a bit having a star-shaped external contour as viewed axially and a mating socket having a star-shaped internal contour as viewed axially, which comprises:
individual arms of the star are pointed arcs, the outer points of which lie on a common outer circle, the pointed arcs being delimited by two radii, the centre points of which lie on an inner circle around the axis of rotation of the driving feature and the contour of the bit having a mating contour on the socket adapted in such a manner that the radii of the flanks of the bit and the socket come to bear against one another so as to produce a flat pressing surface, wherein, the bit and the socket are adapted to one another in that the radii of the flanks of the bit are 4% to 12% smaller than the associated socket, while the inner circle of the bit and the inner circle of the socket on which the centre points of the radii are arranged around the axis of rotation of the bit and the socket have diameter, wherein the diameter of the inner circle of the bit is up to 6% larger than the diameter of the inner circle of the socket,
characterised in that, for a driving socket tool an outer tangential angle ($\beta 1$) is between 71° and 76° and an inner tangential angle ($\beta 2$) is between 57° and 63°.

5. A combination of a bit having a star-shaped external contour as viewed axially and a mating socket having a star-shaped internal contour as viewed axially, which comprises:
individual arms of the star are pointed arcs, the outer points of which lie on a common outer circle, the pointed arcs being delimited by two radii, the centre points of which lie on an inner circle around the axis of rotation of the driving feature and the contour of the bit having a mating contour on the socket adapted in such a manner that the radii of the flanks of the bit and the socket come to bear against one another so as to produce a flat pressing surface, wherein, the bit and the socket are adapted to one another in that the radii of the flanks of the bit are 4% to 12% smaller than the associated socket, while the inner circle of the bit and the inner circle of the socket on which the centre points of the radii are arranged around the axis of rotation of the bit and the socket have diameter wherein the diameter of the inner circle of the bit is up to 6% larger than the diameter of the inner circle of the socket,
characterised in that, for a driven socket on a screw head fastener, an inner transition radius ($r_i$) is between 6.0% and 9.5% of the flank radius and an outer transition radius ($r_a$) is between 13.5% and 17.5% of the flank radius and the diameter of the inner circle is between 36% and 42% of the diameter of the outer circle.

6. A combination of a bit having a star-shaped external contour as viewed axially and a mating socket having a star-shaped internal contour as viewed axially, which comprises:
individual arms of the star are pointed arcs, the outer points of which lie on a common outer circle, the pointed arcs being delimited by two radii, the centre points of which lie on an inner circle around the axis of rotation of the driving feature and the contour of the bit having a mating contour on the socket adapted in such a manner that the radii of the flanks of the bit and the socket come to bear against one another so as to produce a flat pressing surface, wherein, the bit and the socket are adapted to one another in that the radii of the flanks of the bit are 4% to 12% smaller than the associated socket, while the inner circle of the bit and the inner circle of the socket on which the centre points of the radii are arranged around the axis of rotation of the bit and the socket have diameter wherein the diameter of the inner circle of the bit is up to 6% larger than the diameter of the inner circle of the socket,
characterised in that, for a driving bit tool, an inner transition radius ($R_i$) is between 9.0% and 12.5% of the flank radius and an outer transition radius ($R_a$) is between 6.5% and 10.0% of the flank radius and the diameter of an inner circle (114) is between 40% and 45% of the diameter of the outer circle.

7. A combination of a bit having a star-shaped external contour as viewed axially and a mating socket having a star-shaped internal contour as viewed axially, which comprises:
individual arms of the star are pointed arcs, the outer points of which lie on a common outer circle, the pointed arcs being delimited by two radii, the centre points of which lie on an inner circle around the axis of rotation of the driving feature and the contour of the bit having a mating contour on the socket adapted in such a manner that the radii of the flanks of the bit and the socket come to bear against one another so as to produce a flat pressing surface, wherein, the bit and the socket are adapted to one another in that the radii of the flanks of the bit are 4% to 12% smaller than the associated socket, while the inner circle of the bit and the inner circle of the socket on which the centre points of the radii are arranged around the axis of rotation of the bit and the socket have diameter wherein the diameter of the inner circle of the bit is up to 6% larger than the diameter of the inner circle of the socket,
characterised in that, for a driven socket on a screw head fastener, an outer tangential angle ($\alpha 1$) is between 72.5° and 75° and an inner tangential angle ($\alpha 2$) is between 60° and 63°.

8. A combination of a bit having a star-shaped external contour as viewed axially and a mating socket having a star-shaped internal contour as viewed axially, which comprises:
individual arms of the star are pointed arcs, the outer points of which lie on a common outer circle, the pointed arcs being delimited by two radii, the centre points of which lie on an inner circle around the axis of rotation of the driving feature and the contour of the bit having a mating contour on the socket adapted in such a manner that the radii of the flanks of the bit and the socket come to bear against one another so as to produce a flat pressing surface, wherein, the bit and the socket are adapted to one another in that the radii of the flanks of the bit are 4% to 12% smaller than the associated socket, while the inner circle of the bit and the inner circle of the socket on which the centre points of the radii are arranged around the axis of rotation of the bit and the socket have diameter wherein the diameter of the inner circle of the bit is up to 6% larger than the diameter of the inner circle of the socket, characterised in that for a driving bit tool, an outer tangential angle (β2) is between 69° and 74° and an inner tangential angle (β2) is between 54° and 59°.

9. A combination of a bit having a star-shaped external contour as viewed axially and a mating socket having a star-shaped internal contour as viewed axially, which comprises:

individual arms of the star are pointed arcs, the outer points of which lie on a common outer circle, the pointed arcs being delimited by two radii, the centre points of which lie on an inner circle around the axis of rotation of the driving feature and the contour of the bit having a mating contour on the socket adapted in such a manner that the radii of the flanks of the bit and the socket come to bear against one another so as to produce a flat pressing surface, wherein, the bit and the socket are adapted to one another in that the radii of the flanks of the bit are 4% to 12% smaller than the associated socket, while the inner circle of the bit and the inner circle of the socket on which the centre points of the radii are arranged around the axis of rotation of the bit and the socket have diameter wherein the diameter of the inner circle of the bit is up to 6% larger than the diameter of the inner circle of the socket, characterised in that, for a driven bit on a screw head fastener having an external contour, the flank radius has dimensions of 2.55 times to 2.85 times and the inner circle has dimensions of 4.1 times to 4.3 times and an intermediate circle has dimensions of 2.15 times to 2.45 times and an outer circle has dimensions of 1.65 times to 1.95 times the width (W) of a matching hexagon key.

10. A combination of a bit having a star-shaped external contour as viewed axially and a mating socket having a star-shaped internal contour as viewed axially, which comprises:

individual arms of the star are pointed arcs, the outer points of which lie on a common outer circle, the pointed arcs being delimited by two radii, the centre points of which lie on an inner circle around the axis of rotation of the driving feature and the contour of the bit having a mating contour on the socket adapted in such a manner that the radii of the flanks of the bit and the socket come to bear against one another so as to produce a flat pressing surface, wherein, the bit and the socket are adapted to one another in that the radii of the flanks of the bit are 4% to 12% smaller than the associated socket, while the inner circle of the bit and the inner circle of the socket on which the centre points of the radii are arranged around the axis of rotation of the bit and the socket have diameter wherein the diameter of the inner circle of the bit is up to 6% larger than the diameter of the inner circle of the socket, characterised in that, for a driven socket on a screw head fastener having an internal contour, the flank radius has dimensions of 2.05 times to 2.35 times and the inner circle has dimensions of 3.75 times to 4.05 times and the intermediate circle has dimensions of 1.75 times to 2.05 times and the outer circle has dimensions of 1.35 times to 1.65 times the breadth (B) of a matching external hexagon screw head.

* * * * *